Feb. 23, 1960         J. W. BLAIR         2,926,046
COMBINATION CHECK VALVE

Filed Dec. 30, 1957         2 Sheets-Sheet 1

INVENTOR.
JOHN W. BLAIR
BY
William P. Hickey
ATTORNEY

Feb. 23, 1960 J. W. BLAIR 2,926,046
COMBINATION CHECK VALVE
Filed Dec. 30, 1957 2 Sheets-Sheet 2

INVENTOR.
JOHN W. BLAIR
BY
William P. Hickey
ATTORNEY

United States Patent Office 2,926,046
Patented Feb. 23, 1960

2,926,046

COMBINATION CHECK VALVE

John W. Blair, South Bend, Ind., assignor to Bendix Aviation Corporation, South Bend, Ind., a corporation of Delaware Application December 30, 1957, Serial No. 705,877

8 Claims. (Cl. 303—30)

The present invention relates to vacuum actuated braking systems for trains of separable vehicle units; and more particularly to simple means for improving the safety of such systems.

Vacuum actuated braking systems currently being used in tractor-trailer vehicles employ brake actuating motors on the trailer portion of the vehicle which apply the brakes when vacuum is communicated to the motor. Actuation of the trailer's brake applying motors is controlled by means of a conversion valve mounted on the trailer, which valve is continually supplied with service vacuum by means of a service vacuum line which leads to a vacuum source mounted on the tractor portion of the vehicle. Regulation of the conversion valve of the trailer is had by means of a vacuum control line that leads to a control valve on the tractor portion of the vehicle; and the conversion valve is so constructed and arranged as to release the brakes of the trailer when vacuum of substantially equal intensity is supplied to both the service and control lines, and is constructed and arranged to apply the brakes of the trailer when a pressure above that existing in the service vacuum line is supplied to the control line of the vehicle. By means of such an arrangement accidental separation of the portions of the vehicle causes air pressure to enter the control line and the brakes of the tractor to be applied. Present day systems employ check valve means in the portion of the vacuum service line which is rigidly connected to the trailer portion of the vehicle such that service vacuum will be held in the conversion valve during separation of the tractor and trailer portions of the vehicle. A normally closed check valve should not be used in the service line leading to the trailer; inasmuch as it produces a pressure differential between the control and service lines causing the brakes of the trailer to be applied whenever a slight drop in vacuum occurs. This is particularly undesirable when manifold vacuum from the engine of the vehicle is used as a vacuum source; inasmuch as it fluctuates widely with throttle movement. A normally open check valve in the service line leading to the conversion valve of the trailer permits the pressure intensity in both the service and control lines to rise and fall together during fluctuations in the intensity of the vacuum supply; and thereby eliminates the possibility of an automatic application of the brakes during the normal fluctuations of the vacuum supply. A normally open check valve in the service line can be set to remain open during a normal fluctuation of the vacuum supply, and can be set to close upon a sudden rush of air as occurs during rupture of the service line during separation of the tractor and trailer portions. A disadvantage of a normally open check valve is that slow leaks anywhere in the system will not cause the normally open check valve to close; and will thereby permit a complete drain of actuating vacuum from the conversion valve of the trailer to totally disable the brakes of the trailer.

An object of the present invention is the provision of a new and improved vacuum actuated braking system for a train of separable vehicle units in which means are provided in the service vacuum supply line which will automatically valve off the portion of the service vacuum system mounted on the controlled unit upon a rupture of the interconnecting service vacuum line; and yet will permit rise and fall of vacuum intensity in the service vacuum system of the controlled unit such as occurs during the normal fluctuations of the vacuum supply, and will also close off the service line leading to the controlled unit whenever the vacuum intensity of the vacuum supply approaches within a predetermined degree of atmospheric pressure.

A further object of the present invention is the provision of a new and improved simple valve structure which can be installed in the service line of present day vehicles to provide a system of the above described type.

The invention resides in certain constructions and combinations and arrangements of parts, and further objects and advantages will become apparent to those skilled in the art to which the invention relates from the following description of the preferred embodiments described with reference to the accompanying drawings forming part of this specification, and in which.

Figure 1:
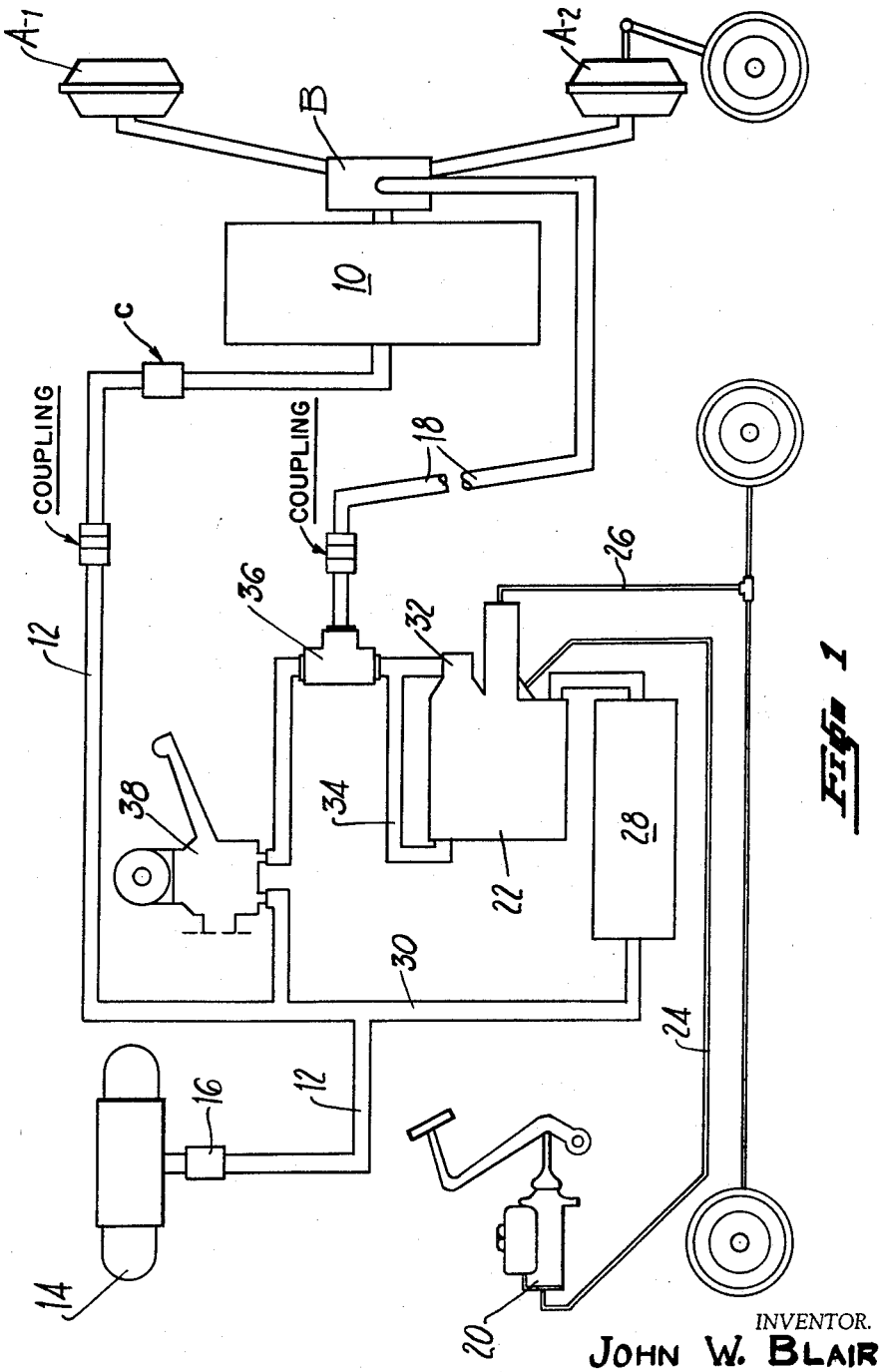
Figure 1 is a schematic view of a vacuum powered tractor-trailer braking system embodying principles of the present invention.

The tractor-trailer braking system shown in Figure 1 generally comprises a pair of vacuum actuated brake motors $A^1$ and $A^2$, respectively, which are mounted on the trailer portion of the vehicle, and which apply the brakes of the trailer when vacuum is communicated thereto. The regulation of vacuum supplied to the brake motors $A^1$ and $A^2$ is controlled by means of a conversion valve B which is mounted on the trailer, and which in turn is supplied with vacuum from a reservoir 10 mounted on the trailer. Vacuum is continuously supplied to the reservoir 10 through an interconnecting service vacuum line 12 which leads to the tractor portion of the vehicle, and which in turn is supplied with vacuum from the manifold 14 of the propelling engine of the tractor through a normally closed check valve 16.

Operation of the conversion valve B is had by means of a vacuum control line 18 which connects the conversion valve B to a control valve on the tractor portion of the vehicle; and the conversion valve B is so constructed and arranged as to communicate atmospheric pressure to the brake motors $A^1$ and $A^2$ whenever vacuum of the same intensity is supplied to both the service vacuum and control lines 12 and 18 respectively, and to communicate the reservoir 10 to each of the brake motors $A^1$ and $A^2$ whenever the pressure in the control line 18 exceeds the pressure in the reservoir 10. By means of such an arrangement, a rupture in the control line 18 (such as occurs during separation of the units of the vehicle) causes the pressure in the control line 18 to automatically be raised above that in the vacuum reservoir 10 and thereby produces an automatic application of the brakes of the trailer.

The braking system shown of the tractor portion of the vehicle is what is generally known as a vacuum over hydraulic system wherein the individual brake applying motors of the tractor are hydraulic cylinders (not shown) which may be operated by hydraulic pressure produced in a foot pedal lever operated master cylinder 20. The hydraulic brake actuating system of the tractor also includes a vacuum powered booster 22 which receives the output pressure from the master cylinder 20 through the interconnecting line 24, and which intensifies the pressure received from the master cylinder 20 and discharges it to the hydraulic brake actuating motors (not shown) through its discharge line 26. The vacuum powered booster 22 includes a servo motor portion having a power piston (not shown), to the rear side of which, vacuum from the manifold 14 is continually communicated through a reservoir 28 in a branch vacuum supply line 30 leading to the interconnecting service vacuum line 12. Operation of the power booster 22 is controlled by means of a hydraulically actuated control valve 32 which receives its signal from the master cylinder through interconnecting hydraulic line 24. When the master cylinder is not being actuated, control valve 32 supplies vacuum of the same intensity to the back side of the power piston; and when hydraulic pressure is received from the master cylinder 20, control valve 32 communicates atmospheric pressure to the back side of the power piston. Regulated pressure from the control valve 32 is communicated with the back side of the power piston through line 34 and is simultaneously communicated with the vacuum control line 18 through a shuttle valve structure 36 whose function will later be apparent.

The tractor portion of the vehicle is also provided with a hand controlled valve 38, which normally permits vacuum from the service line 12 to be communicated with the vacuum control line 18, and which when actuated closes off the service line 12 from the control line 18 and bleeds atmospheric pressure into the control line 18 to permit an actuation of the trailer's brakes independently of that produced by means of the master cylinder 20. The shuttle valve 36 serves the function of communicating the larger of either of the discharged pressures of the hand controlled valve 38 or the control valve 32 to the vacuum control line 18, and thereby permits either one of the control valves to intensify the application of the brakes of the trailer previously produced by the other of the control valves. The general construction and operation of the system so far described is similar to that shown and described in the Earl R. Price Patent No. 2,719,609; and for a more complete understanding of its construction and operation, reference may be had to the above mentioned patent.

According to principles of the present invention, means are provided in the portion of the service vacuum supply system rigidly mounted on the trailer portion of the vehicle which will close off the trailer portion of the service vacuum system upon a large rush of air into the system, as occurs for instance, during break-away of the tractor and trailer portion; and which will also close the trailer portion of the service vacuum system whenever the service vacuum approaches within a predetermined level of atmospheric pressure. The above mentioned means may be made in two or more individual units, but in the preferred arrangement will be incorporated within one simple valve structure which can be easily inserted in the braking systems of existing tractor-trailer vehicles.

Figure 2:
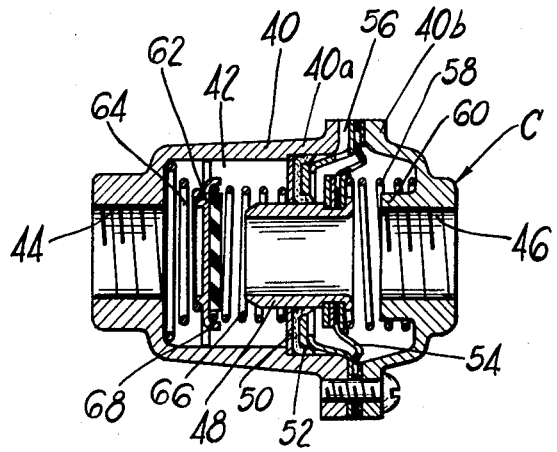
Figure 2 is a cross-sectional view of a valve shown in Figure 1, and which embodies principles of the present invention.

The safety means C shown in Figure 2 of the drawings generally comprises a housing or body member 40 having an axially extending internal valve chamber 42 therein. One end of the housing 40 is threaded to provide an inlet connection 44 for receiving the line 12 leading to the vacuum supply of the tractor, and the other end of the housing 40 is similarly threaded to provide an outlet connection 46 adapted to be connected to the reservoir 10. The body member 40 is formed in two axially positioned sections 40a and 40b respectively, and a tubular member or sleeve 48 is axially positioned in the chamber 42 between the inlet and outlet connection for conducting flow therethrough. The section 40a of the body member is provided with a generally rigid partition member having a seal 52 therein which slidingly-sealingly engages the outer surface of the tubular member or sleeve 48 in a manner permitting axial movement of the tubular member 48. A movable wall or diaphragm 54 is fastened to the tubular member 48 on its end adjacent the outlet connection 46; and the outer edges of the diaphragm 54 are clamped and sealed between the sections 40a and 40b of the housing member which are suitably bolted together. The side walls of the body member 40a, the sleeve 48, the rigid partition member 50 and the movable wall 54 form an enclosure into which atmospheric pressure is communicated by a passageway 56 in the body section 40a, so that the tubular member 48 is biased in the direction of the outlet connection 46 when vacuum is communicated to the internal chamber 42. A coil spring 58 is positioned between the tubular member 48 and the end of the housing section 40b to bias the tubular member 48 in the direction of the valve inlet 44 with an intensity requiring the pressure differential across the movable wall 54 to exceed approximately twelve inches of mercury vacuum before the tubular member 48 will be moved out of engagement with an abutting stop 60 integrally cast into the end of the body member 40b. The surface of abutting stop 60 which the tubular member 48 abuts is a rough cast surface which does not form a seal with respect to member 48; so that vacuum from connection 46 is continually in communication with diaphragm 54.

The valve structure shown in Figure 2 is completed by a disk-shaped valve closure member 62 which is positioned in the internal chamber 42 between the inlet 44 in the valve housing and the adjacent end of the tubular member 48. The valve closure member 62 will normally be supported a predetermined distance away from the tubular member 48, when the tubular member 48 is in engagement with its abutting stop 60, by means of a pair of opposing coil springs 64 and 66 which abut opposite sides of the valve closure member. The valve closure member 62 is provided with a centrally located rubber facing adapted to abut and provide a seal with respect to the adjacent end of the tubular member 48, and the radially outer edges of the valve closure member 62 are provided with a plurality of fingers 68 which guide the valve closure member relative to the side walls of the body member and permit the free passage of air around the radially outer edges of the valve closure member. The amount of clearance provided between the outer edges of the valve closure member and the housing of body member 40, and the sizing of the springs 64 and 66 are such as to require a generally predetermined flow of air from the inlet 44 toward the outlet 46 to move the valve closure member into engagement with the end of the tubular member 48. This predetermined rate of air flow is preferably greater than normally occurs during the routine operation of the vehicle, but will be less than that which occurs during a failure or rupture in the portion of the interconnecting service vacuum line leading to the tractor portion of the vehicle. A break-away of the tractor and trailer portions will therefore immediately cause a closing of the safety means C and will thereby maintain a full vacuum supply in the reservoir 10 of the trailer portion of the vehicle, so that a full application of the brakes of the trailer will be automatically produced.

As previously indicated the control valve 32 on the power booster 22 as well as the hand control valve 38 are normally open valves which communicate service vacuum to the control line leading to the trailer portion of the vehicle, so that both the service vacuum line 12 and the control line 18 are normally maintained at the same vacuum level. It has further been indicated that the conversion valve B is of such a construction as to apply the brakes of the trailer whenever the pressure in the control line 18 is greater than the pressure in the service line 12. With the construction shown in Figure 2, leakage anywhere in the service or control lines will be communicated with the other of the lines; and inasmuch as the valve closure member 62 is normally maintained open with respect to the tubular member 48, this leakage will flow through the valve structure shown in Figure 2 to the conversion valve B. An unbalance in the service vacuum and control vacuum portions of the valve is thereby prevented so that an automatic application of the trailer's brakes will not occur. The manifold vacuum supply to the braking system will normally be in the neighborhood of approximately twenty inches of mercury vacuum, and small leakages of air into the system will continue to flow through the valve structure shown in Figure 2 to thereby prevent a dragging or partial application of the trailer's brakes until such time as a predetermined pressure level is reached (which in the present instance will be a vacuum of approximately twelve inches of mercury). The usual braking system above described will normally maintain vacuums above approximately fifteen inches of mercury vacuum in the reservoir 10 during all of its normal operation; and will usually be capable of providing a substantial trailer brake application when only approximately twelve inches of vacuum are supplied to the trailer brake motors A and A'. At approximately the time that the vacuum in the service vacuum line 12 leaks down to twelve inches of mercury vacuum, the pressure differential across the diaphragm 54 is no longer capable of overcoming the spring 58 to hold the tubular member into engagement with the stop 60; and upon a further slight drop in vacuum in the internal chamber 40, the tubular member 48 moves into abutment with the valve closure member 62 to thereafter prevent a further loss of vacuum in the reservoir 10. Sufficient vacuum is therefore maintained in the braking system of the trailer to automatically produce a brake application on the trailer should a further loss in vacuum in the system raise the pressure in the control line 18. The automatic application of the trailer's brakes so induced will apprise the operator of the vehicle that an emergency condition has been reached wherein a further loss of vacuum will produce a condition where a satisfactory application of the vehicle's brakes can no longer be achieved; and he then can take appropriate measures to build-up the vacuum and release the trailer's brakes.

Figure 3:
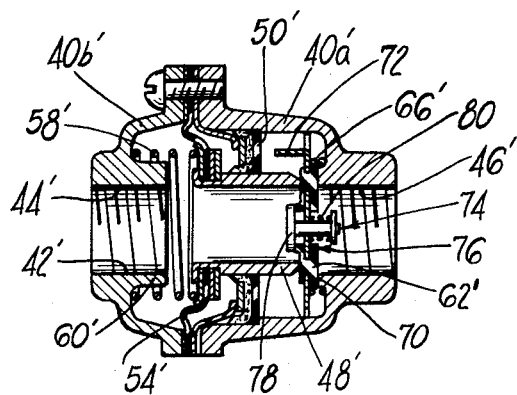
Figure 3 is a cross-sectional view similar to Figure 2 but showing a slightly modified valve construction embodying principles of the present invention.

The embodiment of safety means C shown in Figure 3 of the drawings is capable of being interchanged with the embodiment shown in Figure 2, and in many respects is quite similar to that shown in Figure 2. Those portions of Figure 3 which are similar to corresponding parts shown in Figure 2 are designated by a like reference numeral and are characterized further in that a prime mark is affixed thereto. The inlet 44' and outlet 46' of Figure 3 are interchanged from their position in Figure 2 and an additional annular valve seat 70 is integrally cast into the body section 40a surrounding the outlet connection 46'. The coil spring 66' which normally holds the valve closure member 62' away from its cooperating valve seat is positioned between the valve closure member 62' and the housing section 40a'. In the present instance three axially turned fingers 72 are provided on the valve closure member 62' for engagement with the rigid partition member 50' to maintain the closure member 62' in its normal position away from the valve seat 70.

When the vacuum intensity within the internal chamber 42' exceeds approximately twelve inches of mercury vacuum, the tubular member 48' will be biased into engagement with the abutting stop 60', and the other end of the tubular member 48' will be held out of engagement with the valve closure member 68' by a generally predetermined distance. When the service vacuum is above twelve inches of mercury vacuum, any sudden rush of air will cause the valve closure member 62' to overcome spring 66' and thus be forced into engagement with the valve seat 70 to maintain the service vacuum supply in reservoir 10. When vacuums above approximately twelve inches of mercury vacuum are maintained in the internal chamber 42', small air flows such as occur during normal operation of the braking system will not cause the valve closure member 62' to abut the seat 70, and will not therefore produce a dragging of the vehicle's brakes. When the vacuum in the internal chamber 42' decreases to approximately twelve inches of mercury vacuum, insufficient pressure differential will be exerted on the diaphragm 54' to hold the coil spring 58' compressed; and upon a further slight reduction in vacuum, the tubular member 48' will be biased into engagement with the valve closure member 62'. Movement of the tubular member 48' forces the valve closure member 62' into engagement with its valve seat 70 to simultaneously effect a seal between the valve closure member and the end of the tubular member 48' as well as with its valve seat 70.

In order that vacuums of less than twelve inches of mercury will be communicated with the reservoir 10 when the tubular member 48' abuts the valve closure member 62', an auxiliary valve structure 74 is provided in the valve closure member 62'. The auxiliary valve structure 76 comprises an opening through the valve closure member 62', which opening is normally closed off by a headed poppet member 78 which is biased into engagement with the inlet side of the valve closure member 62' by a coil spring 80. Airflow from the inlet 44' to the outlet 46' is therefore prevented from passing through the opening 76, but flow from outlet 46' to the inlet 44' will compress the coil spring 80 and permit separation of the poppet member 78 from the valve closure member 62'.

While the invention has been described in considerable detail, I do not wish to be limited to the particular constructions shown and described; and it is my intention to cover hereby all novel adaptations, modifications and arrangements thereof which come within the practice of those skilled in the art to which the invention relates.

I claim:

1. In a vacuum power braking system for a multi-unit vehicle having separable units; a brake applying motor on a controlled unit of the vehicle which is actuated when vacuum is supplied thereto; a source of vacuum on a controlling unit of the vehicle; a conversion valve on the controlled unit for actuating said motor; a service vacuum supply line communicating said source of vacuum to said conversion valve; control valve means on said controlling unit which normally supplies an output pressure which is substantially equal to its inlet pressure, and which when actuated supplies an outlet pressure approaching atmospheric pressure; means communicating the inlet of said control valve means to said service line; a control vacuum line communicating the outlet of said control valve to said conversion valve, said conversion valve being constructed and arranged to communicate atmospheric pressure to said motor when substantially equal pressures are supplied to said service and control lines and to actuate said motor as the pressure in said control line becomes greater than that in said service line; normally open check valve means in said service line constructed and arranged to close off said service line when air flow toward said conversion valve exceeds a generally predetermined rate; and means in said service line for closing off said service line when the pressure in said service line is within a generally predetermined level of atmospheric pressure.

2. In a vacuum power braking system for a multi-unit vehicle having separable units; a brake applying motor on a controlled unit of the vehicle which is actuated when vacuum is supplied thereto; a source of vacuum on a controlling unit of the vehicle; a conversion valve on said controlled unit for actuating said motor; a service vacuum supply line communicating said source of vacuum to said conversion valve; control valve means on said controlling unit which normally supplies an output pressure which is substantially equal to its inlet pressure, and which when actuated supplies an outlet pressure approaching atmospheric pressure; means communicating the inlet of said control valve means to said service line; a control vacuum line communicating the outlet of said control valve to said conversion valve, said conversion valve being constructed and arranged to communicate atmospheric pressure to said motor when substantially equal pressures are supplied to said service and control lines and to actuate said motor as the pressure in said control line becomes greater than that in said service line; a check valve body in said service line on said controlled unit, said body having an axially extending internal chamber; a valve closure member positioned generally normally to said axis in said chamber and being guided for axial movement, said closure member being constructed to permit air flow therepast around its periphery; means providing a valve seat through which said flow passes, and which seat closes off flow through said body when abutted by said closure member; spring means biasing said closure member away from said seat with a force requiring a generally predetermined flow of air through said service line toward said conversion valve to seat said closure member against said valve seat; and means biasing said closure member and valve seat together to close off flow through said valve when the vacuum pressure in said service line approaches within a predetermined level of atmospheric pressure.

3. In a vacuum power braking system for a multi-unit vehicle having separable units; a brake applying motor on a controlled unit of the vehicle which is actuated when vacuum is supplied thereto; a source of vacuum on a controlling unit of the vehicle; a conversion valve on said controlled unit for actuating said motor; a service vacuum supply line communicating said source of vacuum to said conversion valve; control valve means on said controlling unit which normally supplies an output pressure which is substantially equal to its inlet pressure, and which when actuated supplies an outlet pressure approaching atmospheric pressure; means communicating the inlet of said control valve means to said service line; a control vacuum line communicating the outlet of said control valve to said conversion valve, said conversion valve being constructed and arranged to communicate atmospheric pressure to said motor when substantially equal pressures are supplied to said service and control lines and to actuate said motor as the pressure in said control line becomes greater than that in said service line; a check valve body in said service line on said controlled unit, said body having an axially extending internal chamber; a valve closure member positioned generally normally to said axis in said chamber and being guided for axial movement, said closure member being constructed to permit air flow therepast around its periphery; means providing a valve seat through which said flow passes, and which seat closes off flow through said body when abutted by said closure member; spring means biasing said closure member away from said seat with a force requiring a generally predetermined flow of air through said service line toward said conversion valve to seat said closure member against said valve seat; a tubular member through which flow through said valve passes for biasing said closure member and valve seat together; a generally fixed partition member in said body in sealing engagement with said tubular member; a pressure responsive movable wall in said chamber connected to said tubular member on the side of said generally fixed partition member opposite to said valve closure member to form an enclosed space to which atmospheric pressure is communicated, said movable wall urging said tubular member away from said valve closure member when vacuum above a predetermined intensity is communicated to said check valve body; and a spring biasing said tubular member toward said valve closure member with a force which causes said valve seat and said closure member to abut when the vacuum in said check valve body falls below said predetermined intensity.

4. In a vacuum power braking system for a multi-unit vehicle having separable units; a brake applying motor on a controlled unit of the vehicle which is actuated when vacuum is supplied thereto; a source of vacuum on a controlling unit of the vehicle; a conversion valve on said controlled unit for actuating said motor; a service vacuum supply line communicating said source of vacuum to said conversion valve; control valve means on said controlling unit which normally supplies an output pressure which is substantially equal to its inlet pressure, and which when actuated supplies an outlet pressure approaching atmospheric pressure; means communicating the inlet of said control valve means to said service line; a control vacuum line communicating the outlet of said control valve to said conversion valve, said conversion valve being constructed and arranged to communicate atmospheric pressure to said motor when substantially equal pressures are supplied to said service and control lines and to actuate said motor as the pressure in said control line becomes greater than that in said service line; a check valve body in said service line on said controlled unit, said body having an inlet, an outlet and an axially extending internal chamber therebetween with a valve seat surrounding said outlet; a valve closure member positioned generally normal to said axis in said chamber and being guided for axial movement toward and away from said valve seat, said closure member being constructed to permit air flow therepast around its periphery; spring means biasing said closure member away from said seat with a force requiring a generally predetermined flow of air through said service line toward said conversion valve to seat said closure member against said valve seat; a tubular member through which flow through said valve passes for biasing said closure member and valve seat together; a generally fixed partition member in said body in sealing engagement with said tubular member; a pressure responsive movable wall in said chamber connected to said tubular member on the side of said generally fixed partition member opposite to said valve closure member to form an enclosed space to which atmospheric pressure is communicated said movable wall urging said tubular member away from valve closure member when vacuum above a predetermined level is communicated to said check valve body; and a spring biasing said tubular member toward said valve closure member with a force which causes said tubular member to abut said closure member when the vacuum in said check valve body falls below said predetermined level.

5. In a vacuum power braking system for a multi-unit vehicle having separable units; a brake applying motor on a controlled unit of the vehicle which is actuated when vacuum is supplied thereto; a source of vacuum on a controlling unit of the vehicle; a conversion valve on said controlled unit for actuating said motor; a service vacuum supply line communicating said source of vacuum to said conversion valve; control valve means on said controlling unit which normally supplies an output pressure which is substantially equal to its inlet pressure, and which when actuated supplies an outlet pressure approaching atmospheric pressure; means communicating the inlet of said control valve means to said service line; a control vacuum line communicating the outlet of said control valve to said conversion valve, said conversion valve being constructed and arranged to communicate atmospheric pressure to said motor when substantially equal pressures are supplied to said service and control lines and to actuate said motor as the pressure in said control line becomes greater than that in said service line; a check valve body in said service line on said controlled unit, said body having an inlet and an outlet and an axially extending internal chamber therebetween a valve closure member positioned generally normally to said axis in said chamber and being guided for axial movement, said closure member being constructed to permit air flow therepast around its periphery; a tubular member having a normal position in said internal chamber through which flow through said valve passes positioned between said valve closure member and the outlet of the valve; spring means biasing said closure member away from the end of said tubular member with a force requiring a generally predetermined flow of air through said service line toward said conversion valve to seat said closure member against said tubular member; a generally fixed partition member in said body in sealing engagement with said tubular member; a pressure responsive movable wall in said chamber connected to said tubular member on the side of said generally fixed partition member opposite to said valve closure member to form an enclosed space to which atmospheric pressure is communicated, said movable wall urging said tubular member away from valve closure member when vacuum is communicated to said check valve body; and a spring biasing said tubular member toward said valve closure member with a force which causes said tubular member to abut said closure member when the vacuum in said check valve body approaches within a predetermined level of atmospheric pressure.

6. In a normally open check valve: a valve body having an axially extending internal chamber with inlet and outlet ports in the opposite ends thereof; a valve closure member positioned in said chamber between said inlet and outlet, said valve closure member being constructed to permit flow past its outer edges and being axially movable in said chamber; means normally positioning said valve closure member in a generally predetermined axial position; an axially extending tubular member having an end constructed and arranged for sealing engagement with said valve closure member, said tubular member being positioned to one side of said valve closure member; an internal partition member in said chamber slidingly sealingly engaging said tubular member; a pressure responsive movable wall in said internal chamber connected to said tabular member on the opposite side of said partition member from said valve closure member; passage means communicating atmospheric pressure to the space between said partition member and said movable wall to bias said tubular member away from said valve closure member when vacuum is communicated to said valve inlet; and a spring biasing said tubular member toward said closure member with a generally predetermined force; whereby said tubular member is held out of engagement with said closure member when the pressure in said outlet is below atmospheric by a generally predetermined intensity and said tubular member closes off said valve when the pressure in said outlet is above said predetermined intensity.

7. In a normally open check valve: a valve body having an axially extending internal chamber with inlet and outlet ports in the opposite ends thereof; a valve closure member positioned in said chamber between said inlet and outlet, said valve closure member being constructed to permit flow past its outer edges and being axially movable in said chamber; opposing spring means normally positioning said valve closure member in a generally predetermined axial position; an axially extending tubular member having an end constructed and arranged for sealing engagement with said valve closure member, said tubular member being positioned to the inlet side of said valve closure member; an internal partition member in said chamber slidingly sealingly engaging said tubular member; a pressure responsive movable wall in said internal chamber connected to said tubular member on the opposite side of said partition member from said valve closure member; passage means communicating atmospheric pressure to the space between said partition member and said movable wall to bias said tubular member away from said valve closure member when vacuum is communicated to said valve inlet; and a spring biasing said tubular member toward said closure member with a generally predetermined force; whereby said tubular member is held out of engagement with said closure member when the pressure in said outlet is below atmospheric by a generally predetermined intensity and said tubular member closes off said valve when the pressure in said outlet is above said predetermined intensity.

8. In a normally open check valve: a valve body having an axially extending internal chamber with inlet and outlet ports in the opposite ends thereof and a valve seat positioned generally normally to said axis to separate said inlet from said outlet; a valve closure member positioned in said chamber on the outlet side of said valve seat, said valve closure member being constructed to permit flow past its outer edges and being axially movable in said chamber; means normally positioning said valve closure member in a generally predetermined axial position away from said valve seat; an axially extending tubular member having an end adapted to abut said valve closure member and force it into engagement with said valve seat, said tubular member being positioned on the outlet side of said valve closure member; an internal partition member in said chamber slidingly sealingly engaging said tubular member; a pressure responsive movable wall in said internal chamber connected to said tubular member on the opposite side of said partition member from said valve closure member; passage means communicating atmospheric pressure to the space between said partition member and said movable wall to bias said tubular member away from said valve closure member when vacuum is communicated to said valve inlet; and a spring biasing said tubular member toward said closure member with a generally predetermined force; whereby said tubular member is held out of engagement with said closure member when the pressure in said outlet is below atmospheric by a generally predetermined intensity and said tubular member closes off said valve when the pressure in said outlet is above said predetermined intensity.

References Cited in the file of this patent

UNITED STATES PATENTS

| | | |
|---|---|---|
| 2,463,172 | Gunderson | Mar. 1, 1949 |
| 2,571,885 | Ingres | Oct. 16, 1951 |

UNITED STATES PATENT OFFICE
CERTIFICATE OF CORRECTION

Patent No. 2,926,046                          February 23, 1960

John W. Blair

It is hereby certified that error appears in the printed specification of the above numbered patent requiring correction and that the said Letters Patent should read as corrected below.

Column 8, line 23, for "normal" read -- normally --.

Signed and sealed this 18th day of October 1960.

(SEAL)
Attest:

KARL H. AXLINE                           ROBERT C. WATSON
Attesting Officer                          Commissioner of Patents